United States Patent
Héroux

(10) Patent No.: US 10,168,482 B2
(45) Date of Patent: *Jan. 1, 2019

(54) MICRO-FILTER STRUCTURES FOR WAVELENGTH DIVISION MULTIPLEXING IN POLYMER WAVEGUIDES

(71) Applicant: INTERNATIONAL BUSINESS MACHINES CORPORATION, Armonk, NY (US)

(72) Inventor: Jean Benoit Héroux, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/615,355

(22) Filed: Jun. 6, 2017

(65) Prior Publication Data
US 2017/0269305 A1    Sep. 21, 2017

Related U.S. Application Data

(63) Continuation of application No. 14/943,744, filed on Nov. 17, 2015, now Pat. No. 9,709,746.

(51) Int. Cl.
*G02B 6/12* (2006.01)
*G02B 6/122* (2006.01)
*G02B 6/293* (2006.01)

(52) U.S. Cl.
CPC ..... *G02B 6/29368* (2013.01); *G02B 6/12007* (2013.01); *G02B 6/29364* (2013.01);
(Continued)

(58) Field of Classification Search
None
See application file for complete search history.

(56) References Cited

U.S. PATENT DOCUMENTS 6,011,641 A     1/2000   Shin et al.
6,150,190 A *  11/2000   Stankus ............... H01L 31/1804
                                                      257/E31.128
(Continued)

FOREIGN PATENT DOCUMENTS

WO    WO 2010036081 A2 *  4/2010   ............... G02B 6/42

OTHER PUBLICATIONS

List of IBM Patents or Patent Applications Treated as Related dated Jun. 6, 2017, 2 pages.
(Continued)

*Primary Examiner* — Rhonda S Peace
(74) *Attorney, Agent, or Firm* — Tutunjian & Bitetto, P.C.; Vazken Alexanian

(57) ABSTRACT

A wavelength division multiplexing filter and methods of forming the same include an optical dielectric filter having multiple dielectric layers. The optical dielectric filter has a high reflectivity at a first wavelength and a high transmissivity at one or more additional wavelengths. The dielectric layers include a structure of layers following the pattern L-[M/2-H-M/2]N-L, where L layers include a first dielectric material, H layers include a second dielectric material, M/2 layers have a mixture of the first and second dielectric material and have a thickness half that needed to provide reflectivity at the first wavelength, and N is a number of repetitions for the structure in brackets.

17 Claims, 4 Drawing Sheets

(52) U.S. Cl.
CPC ........ *G02B 6/12004* (2013.01); *G02B 6/1221* (2013.01); *G02B 2006/12109* (2013.01); *G02B 2006/12114* (2013.01); *G02B 2006/12121* (2013.01); *G02B 2006/12135* (2013.01)

(56) References Cited

U.S. PATENT DOCUMENTS

| | | | |
|---|---|---|---|
| 6,212,312 B1* | 4/2001 | Grann | G02B 5/1861 385/24 |
| 7,035,518 B2 | 4/2006 | Imoto | |
| 7,227,691 B2* | 6/2007 | Kamikawa | G02B 5/288 359/588 |
| 7,387,913 B2 | 6/2008 | Yoshimura et al. | |
| 7,729,569 B2* | 6/2010 | Beer | G02B 6/4204 385/14 |
| 7,778,502 B2* | 8/2010 | Hiruta | G02B 6/42 385/14 |
| 8,442,362 B2* | 5/2013 | Nakagawa | B29D 11/0075 385/14 |
| 8,538,209 B1 | 9/2013 | Li | |
| 8,761,550 B2* | 6/2014 | Tan | G02B 6/125 385/14 |
| 9,086,551 B2* | 7/2015 | Heroux | G02B 6/4215 |
| 9,341,797 B2* | 5/2016 | Nakagawa | G02B 6/43 |
| 9,389,363 B2* | 7/2016 | Heroux | G02B 6/4215 |
| 9,389,366 B2* | 7/2016 | Nakagawa | G02B 6/4215 |
| 9,709,746 B2* | 7/2017 | Heroux | G02B 6/29368 |
| 2010/0278485 A1* | 11/2010 | Nakagawa | B29D 11/0075 385/38 |
| 2011/0103762 A1 | 5/2011 | Lee et al. | |
| 2015/0117811 A1* | 4/2015 | Heroux | G02B 6/4215 385/14 |
| 2017/0139144 A1* | 5/2017 | Heroux | G02B 6/29368 |
| 2017/0269305 A1* | 9/2017 | Heroux | G02B 6/29368 |

OTHER PUBLICATIONS

Brian E. Lemoff, et al., MAUI: Enabling Fiber-to-the-Processor With Parallel Multiwavelength Optical Interconnects, Journal of Lightwave Technology, vol. 22, No. 9, Sep. 2004.

* cited by examiner

US 10,168,482 B2

MICRO-FILTER STRUCTURES FOR WAVELENGTH DIVISION MULTIPLEXING IN POLYMER WAVEGUIDES

BACKGROUND

Technical Field

The present invention relates to wavelength division multiplexing and, in particular, to filtering specific wavelengths in polymer waveguides.

Description of the Related Art

One option for increasing the aggregate data transfer rate in an optical system is to use wavelength division multiplexing (WDM) to transmit multiple signal channels having different wavelengths in a single fiber core. This increases the channel density, allowing substantially more information to be sent using the same number of fibers cores.

Recent efforts have focused on integrating polymer waveguides with opto-electronic chip arrays (including, e.g., vertical cavity surface-emitting lasers (VCSELs) and photodiodes) to increase the bandwidth density of an optical transmission system. However, there are challenges in implementing WDM with polymer waveguides. Typically, micro-mirrors using a total internal reflection effect or a gold metal coating are used to couple light from the VCSELs into waveguide cores and from the waveguide cores to the photodiodes. However, such micro-mirrors have no wavelength selectivity in the relevant spectral range and cannot be used as filters with a light signal having multiple wavelengths. As such, conventional micro-mirrors are inadequate for use in implementing WDM with polymer waveguides.

SUMMARY

A wavelength division multiplexing filter includes an optical dielectric filter having multiple dielectric layers. The optical dielectric filter has a high reflectivity at a first wavelength and a high transmissivity at one or more additional wavelengths. The dielectric layers include a structure of layers following the pattern L-[M/2-H-M/2]N-L, where L layers comprise a first dielectric material, H layers comprise a second dielectric material, M/2 layers have a mixture of the first and second dielectric material and have a thickness half that needed to provide reflectivity at the first wavelength, and N is a number of repetitions for the structure in brackets.

A wavelength division multiplexing system includes one or more waveguides, each having one or more wavelength-filtering prisms disposed in a transmission path of the respective waveguide. Each wavelength-filtering prism includes a Bragg mirror having multiple dielectric layers. Each Bragg mirror has a high reflectivity at a respective first wavelength and a high transmissivity at one or more additional wavelengths. The dielectric layers include a structure of layers following the pattern L-[M/2-H-M/2]N-L, where L layers include a first dielectric material, H layers include a second dielectric material, M/2 layers include a mixture of the first and second dielectric material and have a thickness half that needed to provide reflectivity at the first wavelength, and N is a number of repetitions for the structure in brackets.

A method for forming a wavelength division multiplexing filter includes depositing a plurality of dielectric layers on a substrate to form an optical dielectric filter having a high reflectivity at a first wavelength and a high transmissivity at one or more additional wavelengths. The dielectric layers include a structure of layers following the pattern L-[M/2-H-M/2]N-L, where L layers include a first dielectric material, H layers include a second dielectric material, M/2 layers include a mixture of the first and second dielectric material and have a thickness half that needed to provide reflectivity at the first wavelength, and N is a number of repetitions for the structure in brackets. The substrate and the dielectric filter are cut into a prism. The prism is placed into a transmission path of a waveguide.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

DETAILED DESCRIPTION

Embodiments of the present invention use a dielectric Bragg filter in the path of a polymer waveguide core to implement wavelength division multiplexing (WDM). To fabricate such filters, the dielectric layers are formed on a substrate having a high thermal resistance. The filters are then placed in the path of the polymer waveguide cores underneath a photonic chip to provide selective transmission and reflection of the different wavelengths in a WDM signal.

Figure 1:
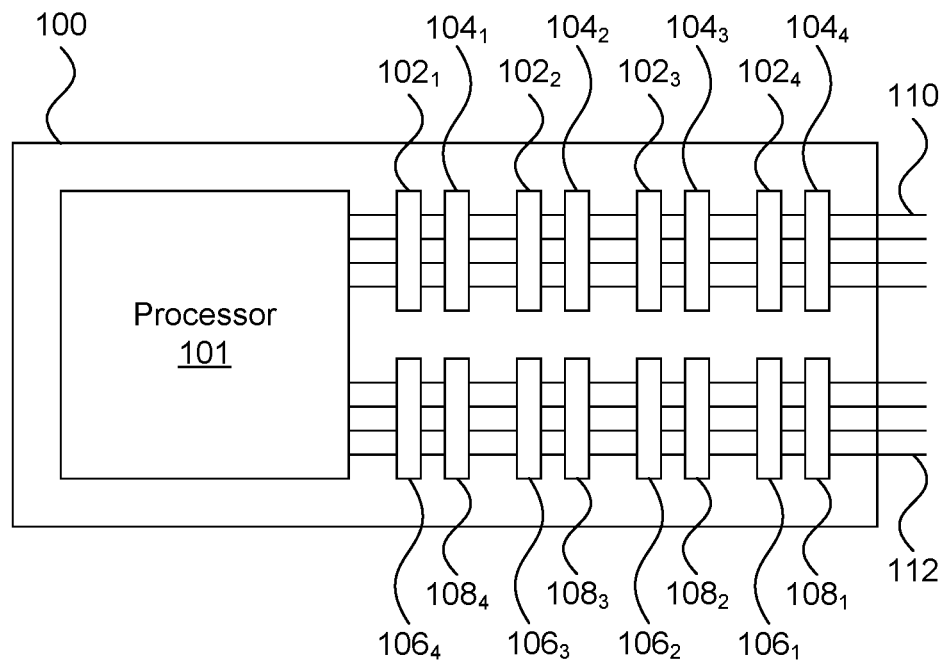
FIG. 1 is a diagram of a wavelength division multiplexing (WDM) device in accordance with the present principles.

Referring now to the drawings in which like numerals represent the same or similar elements and initially to FIG. 1, a WDM device 100 is shown. The WDM device 100 may be built on a printed circuit board and includes a processor 101 that sends and receives electrical signals. To communicate off the device 100, the processor 101 uses a transmission path 110 and a reception path 112 that convert electrical signals from the processor 101 to optical signals that are sent off-chip. The transmission path 110 and the reception path 112 use, for example, polymer waveguides to conduct optical signals from their origin to their destination.

Each path may include multiple waveguide cores, with each waveguide core carrying multiple signals at different wavelengths.

In this particular example, the transmission path 110 includes a set of four laser diode drivers arrays 102 paired with four respective vertical-cavity surface-emitting laser (VCSEL) arrays 104, each emitting a different wavelength. Each driver in the laser diode driver array 102 receives an electrical signal from the processor 101 and drives a VCSEL from the VCSEL arrays 104 to convert the electrical signal to an optical signal that is coupled into a waveguide core of the transmission path 110. On the reception path 112, photo-detector arrays 108 and trans-impedance amplifier arrays 106 convert the received optical signal to an electrical signal received by the processor 101. The transmission path 110 and the reception path 112 may each connect to an optical fiber array to carry the signal to another board.

Implementing this design necessitates some kind of wavelength selectivity. In particular, along the transmission path 110, light from the VCSEL arrays 1042, 1043, and 1044 need to be coupled into the waveguide cores, while light from the arrays 1041, 1042, and 1043 is transmitted. Similarly, on the receiving path 112, the photodiodes 108 should detect a single wavelength from the waveguides, while light at the other wavelengths is transmitted inside the waveguide cores.

To accomplish this, the present embodiments replace the micro-mirror of conventional WDM devices with a dielectric Bragg filter that has selective reflectivity at only one of the multiple wavelengths used in the WDM system. However, the formation of such filters in polymer waveguide systems is challenging. A multilayer filter made of, e.g., silicon dioxide and titanium dioxide layers is formed by evaporating the materials at a high temperature. Existing polymer waveguides and organic photonic fabrication materials cannot withstand those temperatures, resulting in significant damage to the structure.

To address this difficulty, the present embodiments form the micro-filters on a thermally resistant substrate, e.g., glass that is inexpensive, durable, and transparent on which the micro-filters can be deposited. The glass and filter assembly is then cut to form a prism and affixed to the waveguide core to provide wavelength selectivity.

The number of waveguide cores on the respective transmission path 110 and receiving path 112 is arbitrary and can be selected according to the design needs for a particular application. Similarly, the number of wavelengths transmitted in a single waveguide core is determined only by the properties of the waveguide material and opt-electronic device arrays and the design needs of the application. In an exemplary embodiment, between two and four wavelengths may be transmitted using between 12 and 24 waveguide cores.

Figure 2:
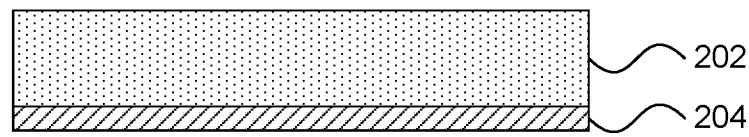
FIG. 2 is a diagram of a step in forming a WDM filter in accordance with the present principles.

Referring now to FIG. 2, a step in the formation of a wavelength-specific filter is shown. A substrate 202 is made from a material with a higher thermal tolerance than polymer, such that the substrate 202 can withstand the high temperature involved in evaporating Bragg filters. The substrate 202 may include, e.g., glass or any other thermally resistant material, such as gallium arsenide that is transparent at the wavelengths being used in the WDM system.

A Bragg mirror layer 204 is formed on the substrate by, e.g., evaporation of dielectric materials. It is particularly contemplated that the mirror layer 204 is formed from multiple alternating dielectric layers, each layer having a respective thickness and refractive index calculated to reflect incident light at one of the wavelengths used in the WDM system. It is particularly contemplated that the mirror layer 204 includes alternating layers of silicon dioxide and titanium dioxide, with the total thickness of the mirror multilayer 204 being determined in accordance with the reflectivity needed for the application, determined by the photonic circuit designer. In an alternative embodiment using a gallium arsenide substrate 202, the Bragg mirror layer 204 may be formed from, e.g., gallium arsenide and aluminum arsenide layers.

In one embodiment, it is specifically contemplated that the substrate layer 202 and filter layer 204 may have a length (in the dimension not shown, into the page) of about 5 mm to about 10 mm. It is further contemplated that the substrate layer 202 may have an exemplary thickness of about 50 μm. The thickness of the substrate layer will be dictated by design considerations and the size of the polymer waveguide cores in the transmission path 110 and the receiving path 112.

In one specific embodiment, the mirror layer 204 is formed from a layered periodic structure having 18 periods. The mirror layer 204 in this embodiment has the structure $L\text{-}[M/2\text{-}H\text{-}M/2]^{18}\text{-}L$, where the L layer is silicon dioxide (having an exemplary index of refraction of 1.46), the M layer is an even mixture of silicon dioxide and titanium dioxide (having an exemplary index of refraction of 1.93), and the H layer is titanium dioxide (having an exemplary index of refraction of 2.4).

Figure 3:
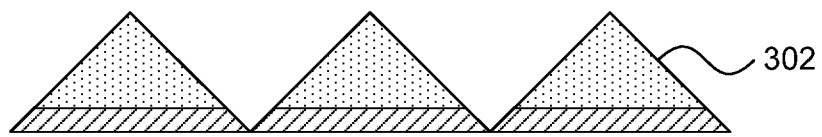
FIG. 3 is a diagram of a step in forming a WDM filter in accordance with the present principles.

Referring now to FIG. 3, a step in the formation of a wavelength-specific filter is shown. In this step, the substrate 202 and mirror layer 204 are cut into prisms 302 and separated. It is specifically contemplated that a dicing saw with a 45-degree blade may be used, producing mirrored prisms 302 that have an equilateral triangular cross section. It is contemplated that other types of dicing blade or cutting mechanism, such as laser ablation, may be used instead to produce prisms that have different sizes. By cutting the prisms 302 from the back of the substrate, roughness of the cut surfaces due to the dicing saw does not occur on the filter 204 and optical degradation is avoided.

It should be understood that the term "mirror" as it is used herein is used to describe a structure having a high reflectivity at one or more wavelengths. Whereas a metal mirror, for example formed from gold, will have a wideband reflectivity, the embodiments described herein include Bragg mirrors, which are reflective only to a narrow wavelength range. Thus, the mirrored prisms 302 described above are designed to reflect light only at specific wavelengths, and to transmit light at other relevant wavelengths.

The present embodiments provide for the fabrication of a large number of prisms 302 in a single batch, with the substrate 202 having a potentially large area. The high volume output results in low cost fabrication and enhanced feasibility. In addition, the filter spectral efficiency can be easily tested before assembly for an entire batch of filters. Forming the filters on a separate substrate prevents heat damage to the waveguides or other structures on the device 100.

Figure 4:
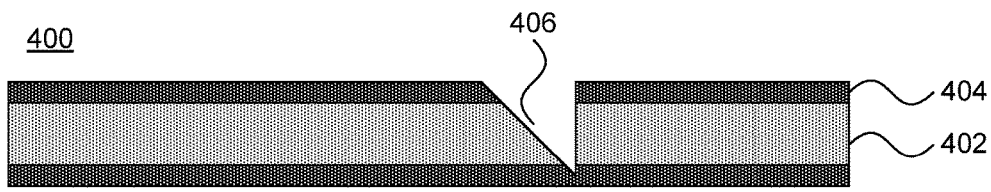
FIG. 4 is a diagram of a step in forming a WDM filter in accordance with the present principles.

Referring now to FIG. 4, a step in the formation of a wavelength-specific filter is shown. In this step, a waveguide 400 is formed with a notch 406 for the addition of a mirrored prism. The waveguide 400 includes a waveguide core 402 that carries signals at the wavelengths of the WDM system. A waveguide clad 404 is formed from a material that is different from the material forming the waveguide core 402, where the difference in index of refraction between the two materials causes total internal reflection of the signals inside the waveguide core 402. In the present embodiment, the notch 406 is formed using a 45-degree, single sided dicing saw. The notch 406 cuts entirely through the waveguide core 402 but leaves at least a portion of an underside of the waveguide clad 404 intact. It is specifically contemplated that the waveguide 400 may have a thickness of about 75 μm, with the waveguide core 402 having a thickness of about 35 μm and the waveguide clad 404 having upper and lower clad thicknesses of about 20 μm.

Figure 5:
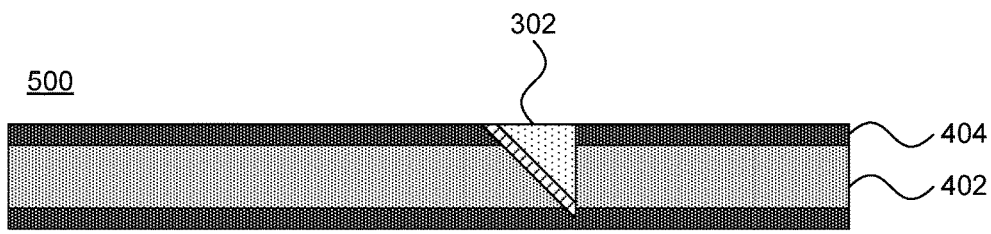
FIG. 5 is a diagram of a step in forming a WDM filter in accordance with the present principles.

Referring now to FIG. 5, a step in the formation of a wavelength-specific filter is shown. In this step a filtering waveguide 500 is formed by inserting a mirrored prism 302 into the notch 406. The face of the mirrored prism 302 is in contact with the waveguide core 402. As light passing through the waveguide core 402 is incident on the prism 302, the selected wavelength is reflected and directed out of the plane of the waveguide 500, while all other wavelengths pass through the mirrored prism 302 without deviating from their path.

Figure 6:
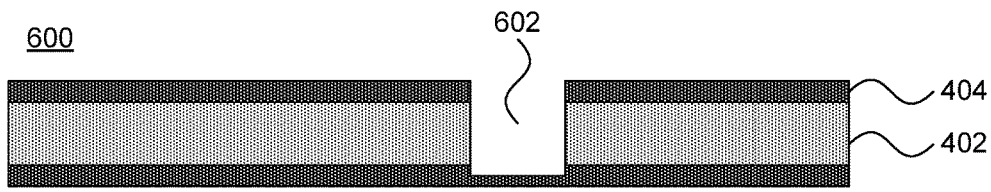
FIG. 6 is a diagram of a step in forming a WDM filter in accordance with the present principles.

Referring now to FIG. 6, an alternative step in the formation of a wavelength-specific filter is shown. In this embodiment, a notch 602 is formed using, e.g., a square dicing blade. As above, the notch cuts through the entirety of the waveguide core 402 but leaves at least a portion of the lower side of the waveguide clad 404 intact.

Figure 7:
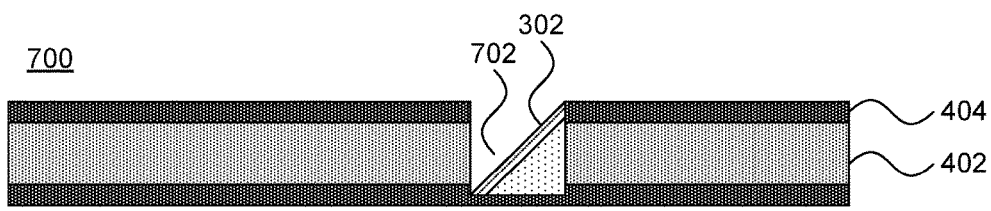
FIG. 7 is a diagram of a step in forming a WDM filter in accordance with the present principles.

Referring now to FIG. 7, an alternative step in the formation of a wavelength-specific filter is shown. In this embodiment, a filtering waveguide 700 is formed by inserting a mirrored prism 302 into the notch 602. Because the mirrored prism 302 has a triangular cross section, an air gap 702 remains between the waveguide core 402 and the mirrored surface of the mirrored prism 302.

The embodiments of FIGS. 5 and 7 have respective advantages. The mirrored prism 302 in the filter 500 shown in FIG. 5 may be flip-mounted and directly contacts the waveguide material, with no air gap between the mirrored prism 302 and the waveguide core 402. The divergence angle of the light beam is therefore narrower, reducing optical loss. However, the refractive index contrast between the waveguide core 402 and the mirrored prism is relatively small, so the mirror multi-layer 204 needs to be thicker (having more pairs of dielectric material).

The filter 700 of FIG. 7, meanwhile, has a higher divergence angle of signals in the air gap, which can increase optical loss. However, the refractive index contrast is larger than in the filter 500 of FIG. 5, so that the mirror layer 204 of the prism 302 may be made thinner.

Figure 8:
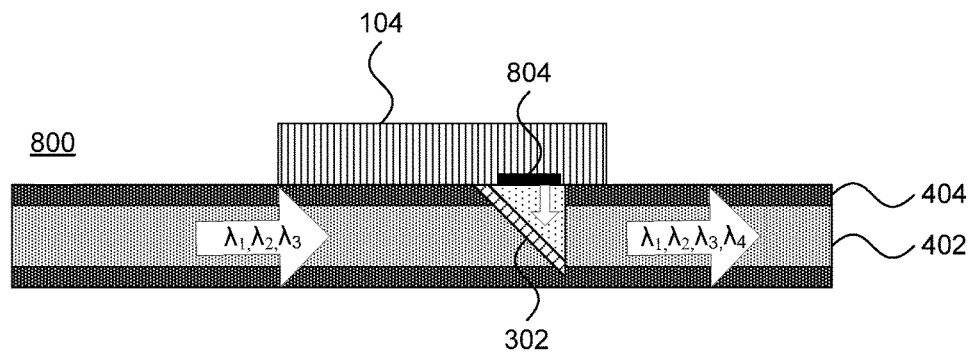
FIG. 8 is a diagram of a WDM transmitter in accordance with the present principles.

Referring now to FIG. 8, a single WDM transmitter 800 is shown, adding a signal having a single wavelength, $\lambda_4$, to a set of wavelengths, $\lambda_1$, $\lambda_2$, $\lambda_3$, already propagating through the waveguide core 402. A VCSEL chip 104 is placed on the waveguide clad 404, with a single VCSEL 804 being positioned directly over the prism 302. Light emitted by the VCSEL 804 is reflected by the Bragg mirror of the prism 302 and is redirected along the path of the waveguide core 402. The signals already in the waveguide core 402, meanwhile, pass through the mirrored prism 302 and are combined with the injected signal to propagate further along the waveguide core 402.

It should be noted that, although the embodiment shown in FIG. 5 is used to illustrate the transmitter 800, the embodiment of FIG. 7 may be used equivalently. In that case the propagating signals and the injected signal will pass through an air gap 702 before returning to the waveguide core 402. Furthermore, although it is specifically contemplated that a VCSEL is used in the present embodiment, the VCSEL 804 may be replaced by any suitable single-wavelength light source.

Figure 9:
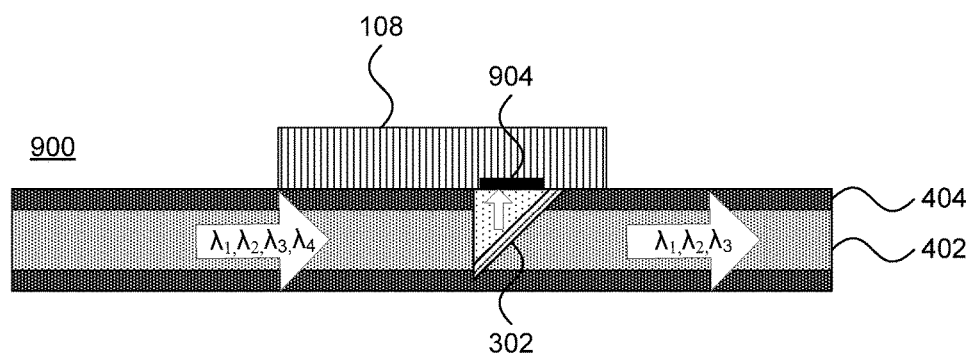
FIG. 9 is a diagram of a WDM receiver in accordance with the present principles.

Referring now to FIG. 9, a single WDM receiver 900 is shown, detecting a signal having a single wavelength, $\lambda_4$, from a set of wavelengths, $\lambda_1$, $\lambda_2$, $\lambda_3$, $\lambda_4$, propagating through the waveguide core 402. A photo-detector chip array 108 is placed on the waveguide clad 404, with its active regions 904 being positioned directly over the mirrored prism 302. Light at a single wavelength $\lambda_4$ is reflected by the Bragg mirror of the mirrored prism 302 and is redirected out of the path of the waveguide core 302 and into the photo-detector active region 904. The other signals, meanwhile, pass through the mirrored prism 302 and continue to propagate into the waveguide core 402.

It should again be noted that, although the embodiment shown in FIG. 5 is used to illustrate the receiver 900, the embodiment of FIG. 7 may be used instead. In that case, the signals will pass through an air gap before interacting with the mirrored prism 302. In addition, although it is specifically contemplated that a photodiode array may be used as the detector 108, it should be recognized that any appropriate sensor for measuring incoming light may be used instead. The photo-detector array 904 may be sensitive only to a specific wavelength of light or may have a spectral range broad enough to be sensitive to several wavelengths.

As noted above, each transmitter 800 and receiver 900 is paired with a respective driver 102 or amplifier 106. The drivers 102 and amplifiers 106 are controlled and powered by signal vias and conductors that run parallel to the waveguides or, alternatively, pass through the substrate on which the waveguide rests. The specific electrical layout will vary according to the design needs of a particular application.

It is specifically contemplated that the waveguides described above may be formed on a substrate and subsequently modified to include the mirrored prisms 302 in the manner described above. However, it is also contemplated that the waveguides may be formed with mirrored prisms 302 prior to attaching the waveguides to a substrate.

It is to be understood that the present invention will be described in terms of a given illustrative architecture having a wafer; however, other architectures, structures, substrate materials and process features and steps may be varied within the scope of the present invention.

It will also be understood that when an element such as a layer, region or substrate is referred to as being "on" or "over" another element, it can be directly on the other element or intervening elements may also be present. In contrast, when an element is referred to as being "directly on" or "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

A design for an integrated circuit chip may be created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer may transmit the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

Methods as described herein may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 10:
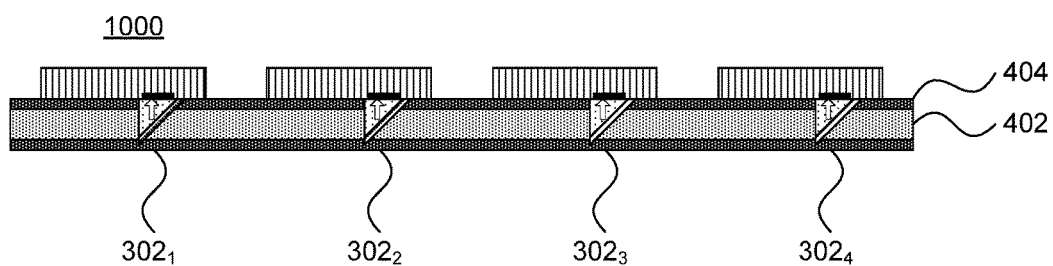
FIG. 10 is a diagram of multiple WDM transmitters on a single waveguide in accordance with the present principles.

Referring now to FIG. 10, a single receiver waveguide 1000 is shown having four filters 302, each filter 302 selecting a different wavelength from a set of four wavelengths. In one specific embodiment, the waveguide core 402 may carry a set of four wavelengths: 850 nm, 940 nm, 1010 nm, and 1080 nm. Following this example, the first filter 3021 may have a high reflectivity for 850 nm and a high transmissivity for 940 nm, 1010 nm, and 1080 nm. The second filter 3022 may then have a high reflectivity for 940 nm and a high transmissivity for 1010 nm and 1080 nm, with 850 nm no longer being relevant after it was removed by filter 3021. The third filter 3023 would then have a high reflectivity for 1010 nm and a high transmissivity for 1080 nm, while the fourth filter 3024 may simply be a metal mirror formed from, e.g., gold. The fourth filter 3024 needs no selectivity, as it is in the final position and all of the other wavelengths will have already been removed by the previous filters.

In one specific embodiment, the four signals are each transmitted at an exemplary bitrate of 25 Gbps in each core channel. The core pitch of the waveguide cores 402 can be formed at 250 µm or lower, resulting in a high bandwidth density and a lower fiber volume.

Figure 11:
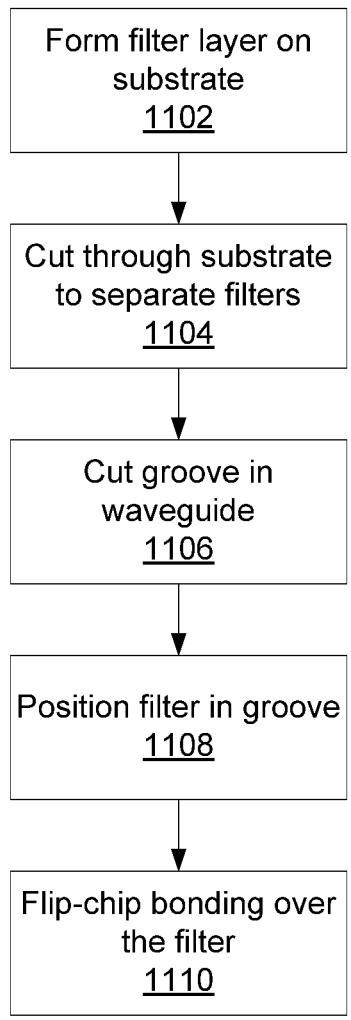
FIG. 11 is a block/flow diagram of a method for forming a WDM filter in accordance with the present principles.

Referring now to FIG. 11, a method of forming a microfilter structure for WDM is shown. Block 1102 forms the filter layer 204 on a substrate 202. As described in detail above, the filter layer 204 is highly reflective to one wavelength being used in the WDM system and highly transparent to the other wavelengths. It is specifically contemplated that block 1102 forms a Bragg mirror on the substrate 202 by evaporating a series of dielectric layers on a substrate having a high thermal resistance (e.g., glass). Block 1104 then cuts through the back of the substrate with a dicing saw. In one particular embodiment, a 45-degree dicing saw is used to cut through the substrate 202 and separate the filter layer 204 into a set of mirrored prisms 302.

Block 1106 cuts grooves in a waveguide. As described above, this groove may be triangular 406, formed with a single-sided 45-degree dicing saw, or may be square 602, formed with a rectangular dicing saw. The groove may cut across multiple waveguides. In addition, block 1106 may form multiple such grooves along the length of the waveguides, one for each wavelength in the WDM system.

Block 1108 then positions the filter in the groove. This may be accomplished by, e.g., using specialized tweezers and a motor stage in an automated process to put the mirrored prisms 302 in the groove 406/602 of the waveguides. An adhesive and/or index matching substance may be used to fix the position of the prism and integrate it tightly in the waveguide. The opto-electronic elements are then flip-chip bonded above the mirrored prisms 302. These may include, e.g., a VCSEL chip array 104 or a photo-detector chip array 108. Other elements may include a driver chip 102 for the VCSEL chip array 104 or a trans-impedance amplifier chip 106 for the photo-detector chip array 108. The driver chips 102 are connected to a processor 101 via suitable metal lines and vias, which controls the communications of the device 100.

Having described preferred embodiments of microfilter structures for wavelength division multiplexing in polymer waveguides (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A wavelength division multiplexing filter, comprising:
an optical dielectric filter comprising a plurality of dielectric layers, said optical dielectric filter having a high reflectivity at a first wavelength and a high transmissivity at one or more additional wavelengths, wherein the plurality of dielectric layers comprise a structure of layers following the pattern L-[M/2-H-M/2]$^N$-L, where L layers comprise a first dielectric material, H layers comprise a second dielectric material, M/2 layers comprise a mixture of the first and second dielectric material and have a thickness half that needed to provide reflectivity at the first wavelength, and N is a number of repetitions for the structure in brackets.

2. The filter of claim 1, further comprising a waveguide, wherein the optical dielectric filter is disposed in a transmission path of the waveguide.

3. The filter of claim 2, wherein the optical dielectric filter is disposed in a triangular groove of the waveguide and wherein there is no air gap in the transmission path.

4. The filter of claim 2, wherein the optical dielectric filter is disposed in a rectangular groove in the waveguide and wherein there is an air gap in the transmission path.

5. The filter of claim 2, wherein the waveguide is a polymer waveguide.

6. The filter of claim 1, wherein the optical dielectric filter is a Bragg mirror comprising either silicon dioxide and titanium dioxide or gallium arsenide and aluminum arsenide.

7. A wavelength division multiplexing system, comprising:
one or more waveguides, each comprising one or more wavelength-filtering prisms disposed in a transmission path of the respective waveguide, each wavelength-filtering prism comprising:
a Bragg mirror comprising a plurality of dielectric layers, each Bragg mirror having a high reflectivity at a respective first wavelength and a high transmissivity at one or more additional wavelengths, wherein the plurality of dielectric layers comprise a structure of layers following the pattern L-[M/2-H-M/2]$^N$-L, where L layers comprise a first dielectric material, H layers comprise a second dielectric material, M/2 layers comprise a mixture of the first and second dielectric material and have a thickness half that needed to provide reflectivity at the first wavelength, and N is a number of repetitions for the structure in brackets.

8. The system of claim 7, wherein the one or more Bragg mirrors are disposed in respective triangular grooves of the waveguide and wherein there is no air gap in the transmission path.

9. The system of claim 7, wherein the one or more Bragg mirrors are disposed in respective rectangular grooves in the waveguide and wherein there is an air gap in the transmission path.

10. The system of claim 7, wherein the Bragg mirror comprises either silicon dioxide and titanium dioxide or gallium arsenide and aluminum arsenide.

11. The system of claim 7, further comprising a laser disposed over each Bragg mirror, configured to emit light at the respective first wavelength, wherein the respective Bragg mirror redirects the light at the respective first wavelength into the transmission path of the waveguide.

12. The system of claim 7, further comprising a photo-detector disposed over each Bragg mirror, configured to detect light at the respective first wavelength, wherein the respective Bragg mirror extracts the respective first wavelength from the transmission path and redirects said respective first wavelength to the photo-detector.

13. The system of claim 7, wherein the one or more waveguides further comprise a metal mirror disposed in the transmission path of the respective waveguide.

14. The system of claim 7, wherein the waveguide is a polymer waveguide.

15. A method for forming a wavelength division multiplexing filter, comprising:
depositing a plurality of dielectric layers on a substrate to form an optical dielectric filter having a high reflectivity at a first wavelength and a high transmissivity at one or more additional wavelengths, wherein the plurality of dielectric layers comprise a structure of layers following the pattern L-[M/2-H-M/2]$^N$-L, where L layers comprise a first dielectric material, H layers comprise a second dielectric material, M/2 layers comprise a mixture of the first and second dielectric material and have a thickness half that needed to provide reflectivity at the first wavelength, and N is a number of repetitions for the structure in brackets;
cutting the substrate and the dielectric filter into a prism; and
placing the prism into a transmission path of a waveguide.

16. The method of claim 15, wherein there is no air gap in the transmission path.

17. The method of claim 15, cutting the substrate and the dielectric filter into a prism comprises cutting through a non-filtered side of the substrate with a 45-degree angle dicing saw or laser ablation.

* * * * *